(12) United States Patent
Wilson

(10) Patent No.: US 7,627,734 B2
(45) Date of Patent: Dec. 1, 2009

(54) VIRTUAL ON-CHIP MEMORY

(75) Inventor: Sophie M. Wilson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 494 days.

(21) Appl. No.: 11/653,273

(22) Filed: Jan. 16, 2007

(65) Prior Publication Data

US 2007/0168642 A1 Jul. 19, 2007

Related U.S. Application Data

(60) Provisional application No. 60/758,537, filed on Jan. 13, 2006.

(51) Int. Cl.
*G06F 12/06* (2006.01)
(52) U.S. Cl. .............................. 711/206; 711/3; 711/203
(58) Field of Classification Search ........................ None
See application file for complete search history.

(56) References Cited

U.S. PATENT DOCUMENTS

| | | | | |
|---|---|---|---|---|
| 5,420,993 A | * | 5/1995 | Smith et al. | 711/206 |
| 5,717,898 A | * | 2/1998 | Kagan et al. | 711/145 |
| 5,787,494 A | * | 7/1998 | DeLano et al. | 711/206 |
| 5,790,979 A | * | 8/1998 | Liedtke | 711/206 |
| 6,889,288 B2 | * | 5/2005 | Bono et al. | 711/118 |
| 2006/0015678 A1 | * | 1/2006 | Wang et al. | 711/104 |
| 2007/0073996 A1 | * | 3/2007 | Kruger et al. | 711/207 |
| 2008/0215848 A1 | * | 9/2008 | Sheu et al. | 711/207 |

* cited by examiner

*Primary Examiner*—Jack A Lane
(74) *Attorney, Agent, or Firm*—Sterne, Kessler, Goldstein & Fox PLLC

(57) ABSTRACT

A "virtual on-chip memory" that provides advantages as compared to an on-chip memory that utilizes a cache. In accordance with the invention, when a CPU attempts to access a memory address that is not on-chip, the access is aborted and the abort is handled at a page level. A single page table is utilized in which each entry constitutes an address in the virtual address space that will be mapped to a page of on-chip memory. The CPU obtains the missing data, updates the page table, and continues execution from the aborted point. Because aborts are handled at the page level rather than the line level, the virtual on-chip memory is less expensive to implement than a cache. Furthermore, critical real-time applications can be stored within a non-virtual portion of the memory space to ensure that they are not stalled.

23 Claims, 5 Drawing Sheets

VIRTUAL ON-CHIP MEMORY

CROSS-REFERENCE TO RELATED APPLICATIONS

The present application claims the benefit of U.S. Provisional Patent Application No. 60/758,537 filed on Jan. 13, 2006, which is incorporated herein by reference in its entirety.

BACKGROUND OF THE INVENTION

1. Field of the Invention

The present invention is generally directed to microprocessor devices. In particular, the present invention relates to microprocessor devices which constitute a System-on-a-Chip (SoC), including but not limited to SoC implementations of a multiprocessor system.

2. Background

Conventional System-on-a-Chip (SoC) implementations utilize large static on-chip memories to meet their memory needs. This memory may potentially be shared among several processors running multiple processes. Given the complexity of combining very large memories on an integrated circuit (IC) with one or more processors, the amount of storage space in these memories may be limited. The conventional solution is to provide the SoC with an even larger off-chip memory in order to meet its memory demands, and treating the on-chip memory as a cache. The downside of this approach is that when a process requests data from the cache which it does not have a copy of, the entire processor must stall while the cache memory goes to the off-chip memory to retrieve a copy of the information. The delays associated with such off-chip memory retrieval are substantial, and not conducive to real-time processing.

Accordingly, what is desired is a system and method that resolves the problem of delays associated with off-chip memory retrieval.

BRIEF SUMMARY OF THE INVENTION

The present invention is directed to using an on-chip memory to support the addressing of a Virtual Address Space (VAS) in a configuration called Virtual On-Chip Memory (VOM). VOM is targeted primarily to System-on-a-Chip (SoC) implementations which typically consist of one or more processors on the same integrated circuit (IC) as a memory. In particular, and as will be described in more detail herein, embodiments of the invention provide a method, system, and a memory for running real-time processes concurrent with non-real-time processes without stalling the real-time process on access to off-chip memory. The solution is also applicable to systems without the demands of real-time processing.

An on-chip memory in accordance with an embodiment of the present invention allows one or more processors located on the same chip as the on-chip memory to retrieve information from a VAS that is much larger than the on-chip memory. Information stored in the on-chip memory represents a subset of the VAS, and pieces of the VAS can be substituted into the on-chip memory as needed by a processor.

In accordance with another embodiment of the present invention, the information stored in memory that is a subset of the information in the VAS is written into the memory by a processor whenever the information is needed by first retrieving the information from the VAS and storing the information into the memory. A notation is made in a page table to indicate which subset of information from the VAS is presently stored in the memory.

In accordance with yet another embodiment of the present invention, a memory will have a separate section which is not a subset of the information from the VAS. This section of memory is used by processes that have a critical need for information, such as real-time processes.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
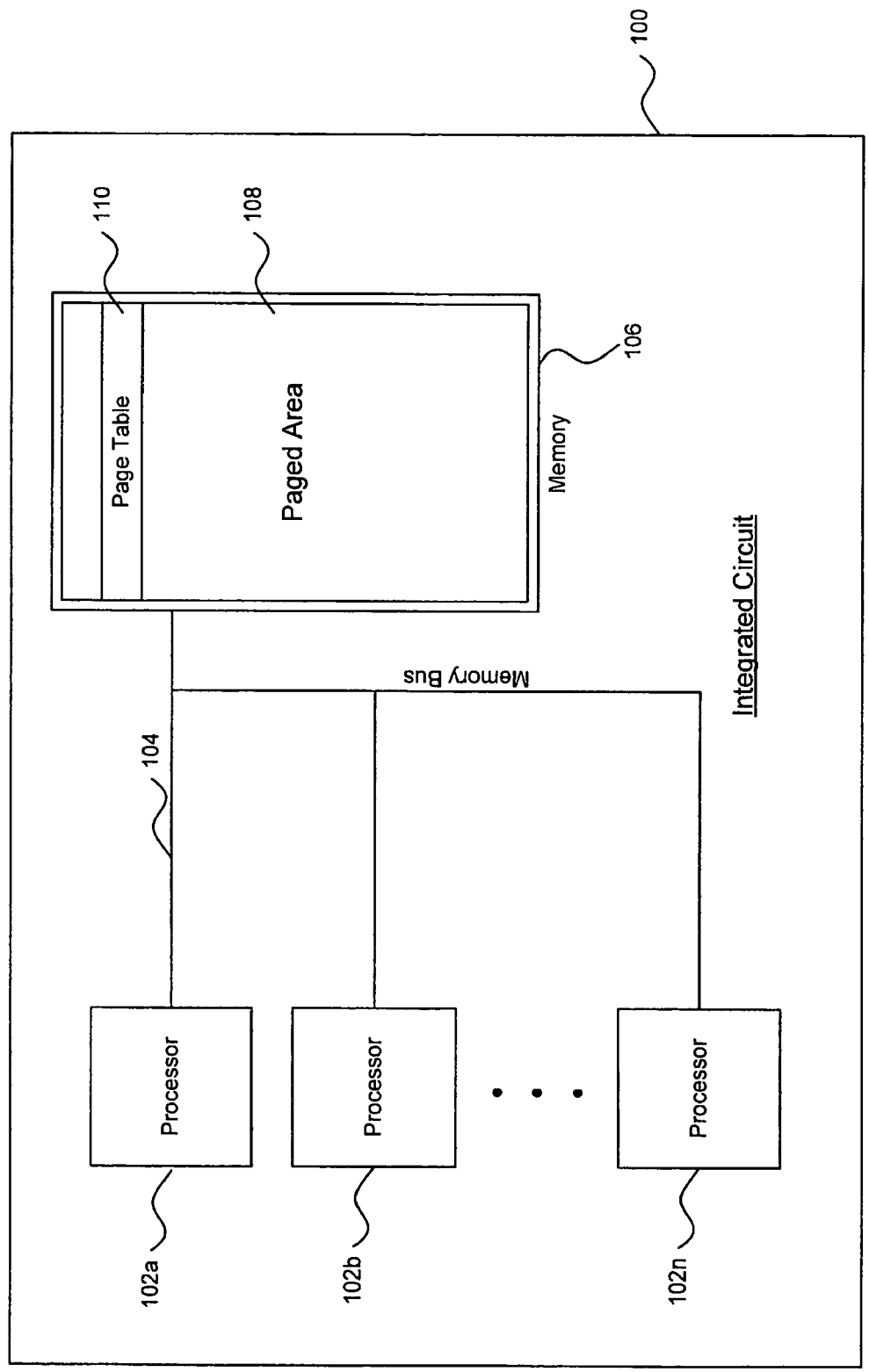
FIG. 1 depicts basic elements of an example System-on-a-Chip using Virtual On-Chip Memory in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction to Virtual On-Chip Memory

Common to many integrated circuit (IC) implementations of a processor is the usage of memory that is tightly coupled to the processor for providing rapid input/output (I/O) rates of information. Such a memory is commonly referred to as a cache. Caches are generally very responsive in many applications, but the responsiveness can suffer greatly when information is requested of the cache that is not present, causing a cache miss which necessitates retrieving the information from off-chip memory. An application which has requested the information will then be required to stall while waiting for the information to be loaded from off-chip memory, a process with a significant delay.

FIG. 1 depicts basic elements of an example System-on-a-Chip (SoC) using Virtual On-Chip Memory (VOM) that avoids the aforementioned shortcomings of conventional implementations. A SoC consists of all of the necessary parts of a computer system on a single IC 100. In example IC 100, there are one or more processors 102a-102n coupled to a memory 106 over a memory bus 104. Memory 106 is responsible for storing a paged area 108 of information and a corresponding page table 110 that holds mappings into the page table. One skilled in the relevant arts will appreciate that paged area 108 and page table 110 can be stored on different memory implementations, and need not share a common memory device such as memory 106.

Any one of the processors 102a-102n reads the paged area 108 of memory 106 by sending an address to read from over the memory bus 104. The processor 102a-102n first reads the page table 110 to determine where in the paged area 108 of memory 106 the information the processor 102a-102n seeks is located. The page table 110 consists of one entry per addressable memory location in the paged area 108 of memory 106. Each entry in the page table 110 identifies the source address within the context of a larger virtual memory, thereby labeling the origin of the information in the addressable memory locations in the paged area 108 of memory 106. As will be appreciated by persons skilled in the relevant art(s) based on the teachings provided herein, there are a variety of methods of using the page table 110 to address the paged area 108 of memory 106, and as such the present invention is not limited to any particular method of populating and reading the page table. Persons skilled in the relevant art(s) based on the teachings provided herein will further appreciate that the page table 110 will generally be at a fixed location within memory 106, but can be located anywhere, even outside of memory 106, where a processor 102a-102n will know to look for it.

Figure 2:
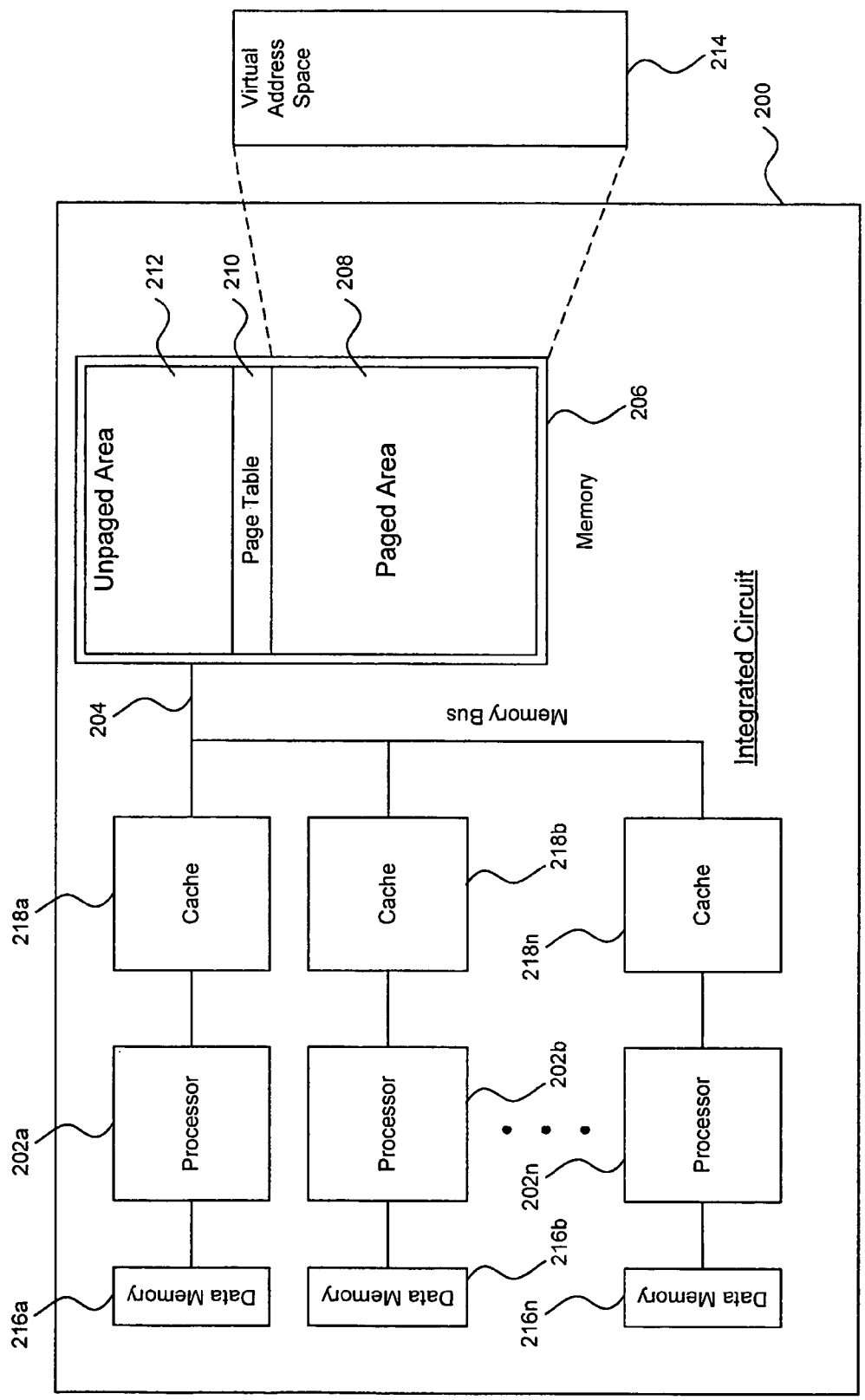
FIG. 2 depicts the basic elements of an example System-on-a-Chip using Virtual On-Chip Memory and introduces further complexities in accordance with an embodiment of the present invention.

FIG. 2 depicts a similar example SoC on IC 200 to the one in FIG. 1, and introduces further complexities, in accordance with an embodiment of the present invention. Processors 202a-202n are each connected to a data memory 216a-216n which allows the processor 202a-202n direct access to data which only it needs. This is trivial in the situation where there is only a single processor 202a-202n, but in a situation where there are multiple processors 202a-202n, each would only be able to access its own data memory 216a-216n. Each processor 202a-202n is also coupled to a cache 218a-218n which functions like a traditional cache memory for any information passed over the memory bus 204. This cache 218a-218n enjoys the benefit of being able to refer to on-chip memory 206 for rapid retrieval of information in the event of a cache miss. Persons skilled in the relevant art(s) based on the teachings provided herein will appreciate that such a cache is optional, but its usage provides for faster information access under certain constraints. Persons skilled in the relevant art(s) based on the teachings provided herein will further appreciate that when such a cache is present, the cache will be required to handle interactions with the next level of memory, and when the cache is not present, the processor will be responsible for the interactions itself. For the purposes of this specification, when a reference is made to the processor storing or requesting information to or from the memory, it should be assumed that this same procedure is handled by the optional cache if the cache is present. Memory 206 is similar to the memory 106 in FIG. 1 except that it further shows the Virtual Address Space (VAS) 214. Memory 206 also contains an unpaged area 212 which is read and written without consulting the page table 210.

The VAS 214 is a virtual memory construct which is composed of any number of physical I/O data streams. For the purposes of this description, it is to be assumed that the VAS 214 behaves much like a single large external memory.

When the processor 202a-202n stores or requests information to or from the memory 206, it sends a message over the memory bus 204 containing the address on which the operation is to be performed. This address refers directly to a location in the unpaged area 212 of memory 206, or alternatively to a location within the VAS 214. For addresses within the unpaged area 212, the information is stored directly or retrieved and returned over the memory bus 204 immediately. On the other hand, for addresses referring to a location within the VAS 214, it is necessary to consult the page table 210, as previously mentioned, in order to determine whether the information presently resides within the paged area 208 of memory 206.

In accordance with an embodiment of the present invention, VAS 214 is stored in a compressed form in an on-chip memory. When processor 202a-202n presents a reference address within the VAS 214 for a read operation, if the information is not available within page table 210, then the requested information is decompressed from VAS 214 and entered into page table 210. Similarly, information in pages flushed from page table 210 is compressed and stored in VAS 214 if modified by a write operation. In accordance with an additional embodiment of the present invention, memory used by a real-time process is stored in on-chip memory. In accordance with a further embodiment of the present invention, memory 206 is stored in its entirety in on-chip memory. One skilled in the relevant arts will appreciate that VAS 214 can similarly be substituted by any desired software algorithm used to provide information to the paged area 208 of memory 206, and need not be embodied in a physical memory structure.

B. Using Virtual On-Chip Memory to Facilitate Real-Time Processing

One of the challenges of real-time processing is reducing the amount of time the a processor spends in a stalled state, waiting for further information before being able to proceed. VOM helps address these challenges by providing a paging technique on an on-chip memory, eliminating processor stalls associated with waiting on a cache miss in a conventional system. While a cache can still be utilized between the processor and the on-chip memory to provide even further speed benefits, a cache miss in this situation isn't critical since the next level of memory is still on-chip.

As shown in FIG. 2, memory 206 is divided into an unpaged area 212 and a paged area 208 of memory, with some space allocated for a page table 210. As will be appreciated by persons skilled in the relevant art(s) based on the teachings provided herein, the unpaged area of memory is not necessary in the implementation of VOM, but providing an unpaged area of memory may be helpful in accelerating certain memory access schemes, such as those needed for real-time processing. Each processor 202a-202n is capable of running both real-time and non-real-time processes simultaneously. Information needed by real-time processes is preloaded in the unpaged area 212 of memory, and information needed by non-real-time processes is kept somewhere within the VAS 214. Generally, the real-time processes are each different instances of the same code base when there are multiple processors 202a-202n, making it possible for the processes to share the same information within the unpaged area 212 of memory, minimizing the system's overall memory footprint. As will be appreciated by persons skilled in the relevant art(s) based on the teachings provided herein, any combination of real-time and non-real time processes can be run on any or all of the processors 202a-202n, and as such the present invention is not limited to the method of configuring a single or multiple processors 202a-202n to necessarily run a real-time process in combination with a non-real-time process.

By placing real-time process information in the unpaged area 212 of memory 206, a developer can be assured that the real-time process will never need to wait for a period of time longer than the delay associated with the information retrieval mechanism of the memory 206 and the propagation delays associated with the memory bus 204. A real-time process in which all of its information is kept in the unpaged area 212 will therefore never suffer the performance hit of a cache miss that requires fetching information from off-chip memory.

In contrast, in this embodiment, non-real-time processes request their information from the VAS 214, since their execution time is less critical than real-time processes. When a non-real-time process requests information from the VAS 214, after the processor 202a-202n consults the cache 218a-218n for the information, the address is checked against the page table 210 to determine if the information requested is presently available in the paged area 208 of memory 206. If it is, then the information is read from the paged area 208 and returned over the memory bus 204, affording the non-real-time process no more of a delay than the real-time process, except perhaps the time associated with consulting the page table 210. However, if the information is not available in the paged area 208 of memory 206 according to the page table 210, then a page fault message is issued and the processor 202a-202n will then abort the non-real-time process that requested the information until the requested information becomes available. The processor 202a-202n can then continue execution of any non-real-time or real-time processes it is responsible for without stalling. In accordance with an embodiment of the present invention, real-time processes may request information from the VAS 214 efficiently if the pages associated with the real-time process are maintained permanently on-chip and are never used to page in other information.

C. Utilizing the Virtual Address Space

Figure 3:
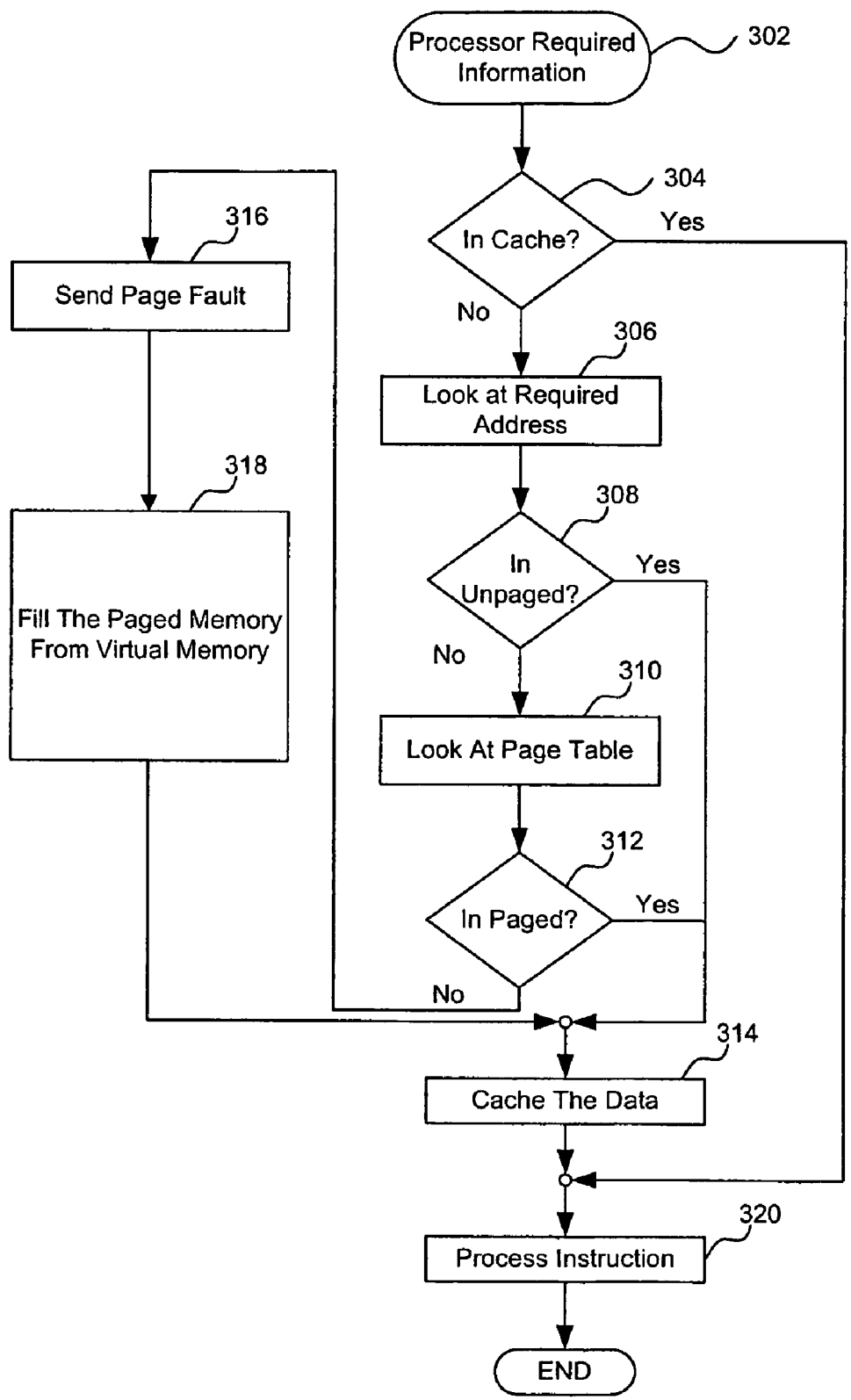
FIG. 3 illustrates a flowchart of a method for reading information from a Virtual On-Chip Memory and responding to a situation where the information is not presently located in the paged memory in accordance with an embodiment of the present invention.

FIG. 3 illustrates a flowchart 300 of a method for reading information from a Virtual On-Chip Memory and responding to the situation where the information is not presently located in the paged memory in accordance with an embodiment of the present invention. The invention, however, is not limited to the description provided by the flowchart 300. Rather, it will be apparent to persons skilled in the relevant art(s) from the teachings provided herein that other functional flows are within the scope and spirit of the present invention.

Flowchart 300 will be described with continued reference to SoC IC 200 described above in reference to FIG. 2. The invention, however, is not limited to that embodiment.

The method of flowchart 300 begins at step 302, in which a processor 202a-202n has requested information from the memory 206 by transmitting an associated address on which to perform an operation. At step 304, a determination is made as to whether this information is already present in the processor's 202a-202n cache 218a-218n, and if so, is immediately read and processed 320. Otherwise, some analysis of the address needs to be done 306 to determine if the reference is to the unpaged area 212 of memory 206. If the requested information is within the unpaged area 212, then it can be immediately provided by the memory 206 over the memory bus 204 to the requesting processor 202a-202n. On the way, the information may be cached 314 by the processor's 202a-202n cache 218a-218n. The information is once again ready to be processed 320.

If the address of the requested information is not in the unpaged area 212, then it must lie somewhere within the VAS 214. The next step is to consult 310 the page table 210 to make a determination 312 of whether the requested information is already stored in the paged area 208 of memory 206. If the information is already present, then it is simply read, cached 314, and processed 320 in a similar manner to the operation of accessing the unpaged area 212.

If the address of the requested information is further not in the paged area 208, then it becomes necessary to fetch the information from the VAS 214. The process requesting the information is alerted to this situation when it is sent a page fault 316, causing the process to respond by aborting. It is then necessary to locate the information within the VAS 214 and store a copy of the information 318 within the paged area 208 of memory 206. With the information 318 stored in the paged area 208 of memory 206, the process is resumed and completes its request for information. In accordance with an embodiment of the present invention, while the process is aborted, real-time processes may continue to execute.

Figure 4:
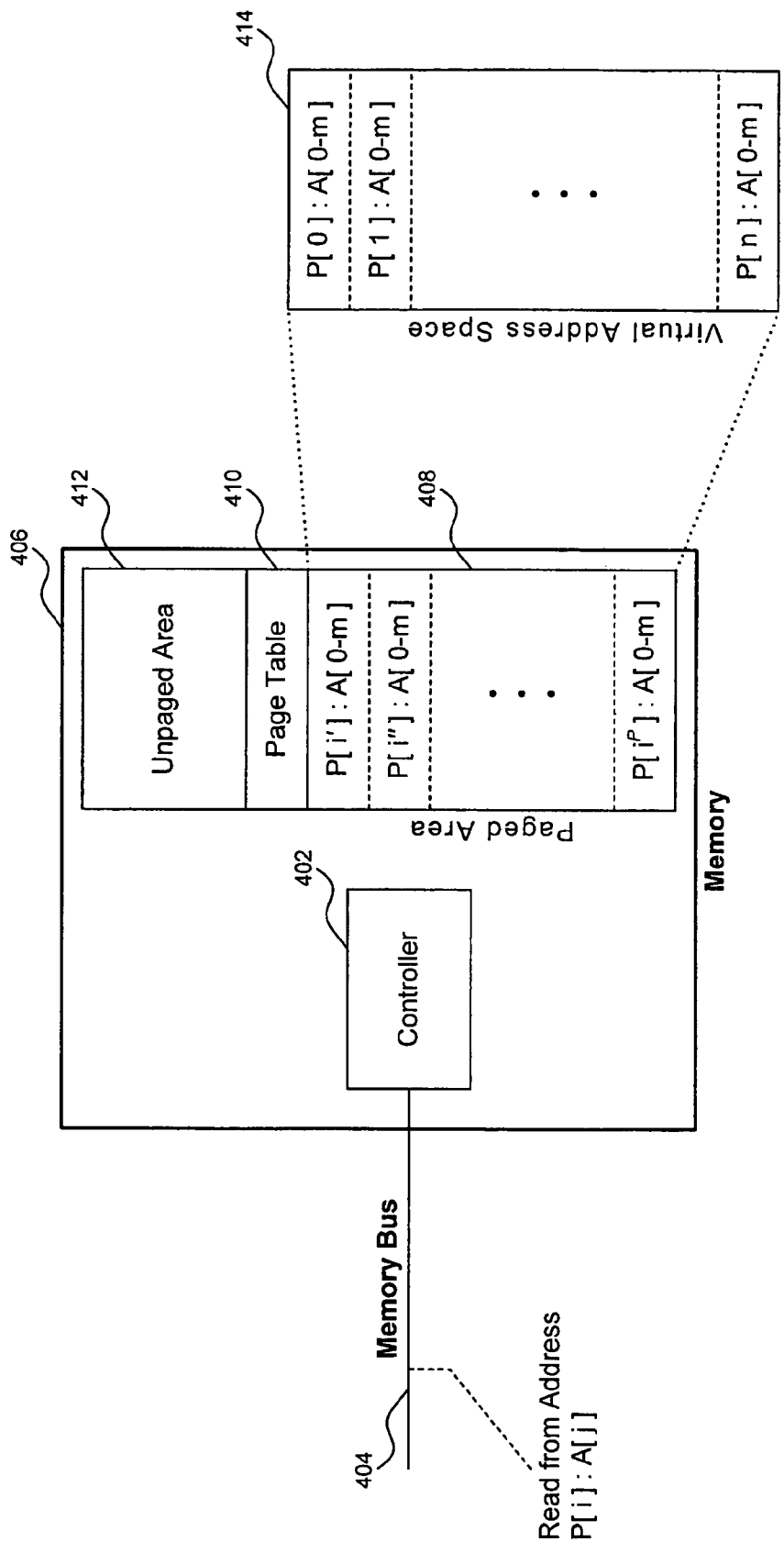
FIG. 4 depicts a virtual memory addressing scheme where an address into the virtual address space is used to consult the page table and find the corresponding paged area of memory in which the requested information is kept in accordance with an embodiment of the present invention.

FIG. 4 depicts a virtual memory addressing scheme where an address into the virtual address space is used to consult the page table and find the corresponding paged area of memory in which the requested information is kept in accordance with an embodiment of the present invention.

The memory 406 is similar to the memory 206 shown in FIG. 2 except that it further depicts a memory controller 402 within the memory 406. This memory controller is used for managing the requests sent by a processor over the memory bus 404, which is similar to the memory bus 204 shown in FIG. 2. The memory 406 further includes a paged area 408, an unpaged area 412, and a page table 410, which are also similar to the paged area 208, the unpaged area 212, and the page table 210 shown in FIG. 2. The VAS 414 is also similar to the VAS 214 in FIG. 2.

The controller 402 can be configured to perform a number of the steps that a processor requesting information could handle. For example, the controller 402 can be configured to issue a page table miss message to a processor whenever information requested from the VAS 414 is not found in the page table 410. As will be appreciated by persons skilled in the relevant art(s) based on the teachings provided herein, the controller 402 is capable of handling the responsibilities associated with memory reads or writes to which it has been assigned, such as issuing a page table miss message to a requesting processor.

When an address to be operated upon, such as with a read operation, is placed on the memory bus 404, it is received by the memory 406 and is handled by the controller 402. The address, as shown in FIG. 4, is broken up into a page P[i] and a page address A[j]. The full address can therefore be represented by P[i]:A[j]. This example is not limiting, however, and one of sufficient skill in the relevant art(s) will appreciate that there are numerous ways to represent a memory address to the same effect.

The entire VAS 414 is broken down into n pages, from P[0] to P[n]. The granularity of the page breakdown determines how many directly addressable VAS 414 entries are within each page, a quantity called m. Each page P[i] therefore has m addresses within it ranging from A[0] to A[m]. Thus any one smallest unit of directly addressable VAS 414 memory is addressable as P[i]:A[j].

The paged area 408 is broken down into p entries, where each entry consists of m individually addressable locations. This has the effect of making each entry in the paged area 408 the same size as each entry in the VAS 414, and an entire page P[i] can be stored within each entry. However, the size of the paged area 408 is much smaller than the entire VAS 414. The controller 402 can manage a request for paged memory by checking the page table 410 to see if a particular page P[i] has had its contents inserted within the paged area 408, which means the particular address A[j] within that page is also in the paged area 408. If the page P[i] is not in the paged area 408, then the controller issues a page fault message, notifying the requester that the information needs to be retrieved from the VAS 414 and the new page inserted into the paged area 408.

The paged area 408 has, as noted above, a total of p page entries, a subset of the n page entries available in the VAS 414. FIG. 4 refers to some of these entries as P[i'], P[i"], through P[$i^p$]. This convention indicates that the pages available in the page table 408 do not necessarily appear sequentially in the VAS 414, and actually consist of any p pages from the VAS 414.

D. Populating the Virtual Address Space

Figure 5:
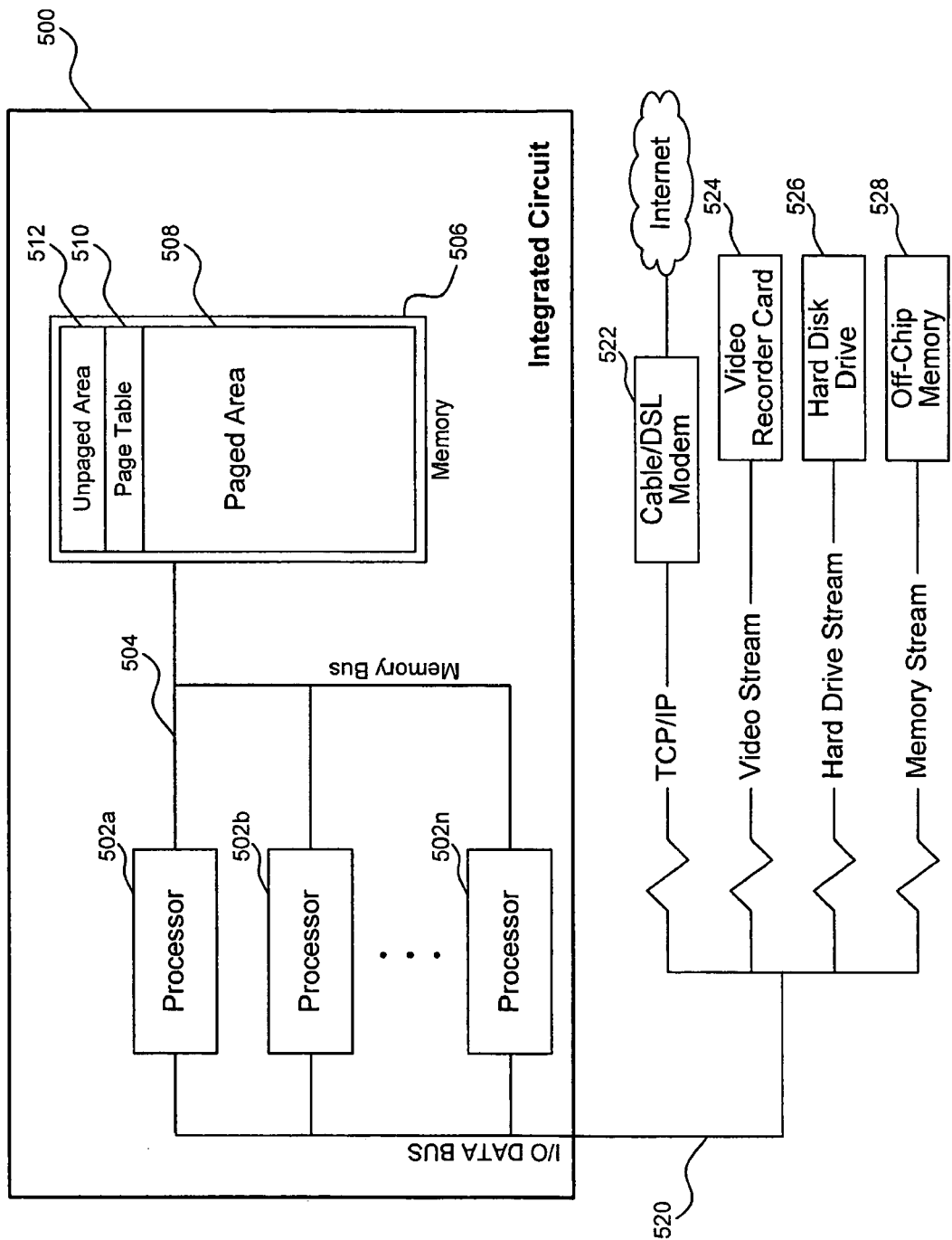
FIG. 5 depicts the basic elements of an example System-on-a-Chip using Virtual On-Chip Memory and further shows a data bus which is used by a processor in order to retrieve information from a data stream that corresponds to a particular location within a virtual address space in accordance with an embodiment of the present invention.

FIG. 5 depicts the basic elements of an example System-on-a-Chip using Virtual On-Chip Memory and further shows a data bus which is used by a processor in order to retrieve information from a data stream that corresponds to a particular location within the virtual address space in accordance with an embodiment of the present invention.

The IC 500 is similar to the IC 200 in FIG. 2, except that the processor 502a-502n has been simplified to remove the optional data memory 216a-216n and cache 218a-218n shown in FIG. 2. FIG. 5 further shows an I/O Data Bus (IODB) 520 which connects processors 502a-502n to a number of stream sources. One of sufficient skill in the relevant art(s) will appreciate, however, that the IODB 520 can actually consist of a number of coupling mechanisms used to provide an interface to an information source with which a processor 502a-502n can communicate, and is not limited to the single bus implementation, nor is it limited to the particular information streams in FIG. 5.

The IODB 520 is connected to a number of streams such as a cable/DSL modem 522 for providing TCP/IP data streams, a video recorder card 524 for providing a video stream, a hard disk drive 526 for providing a stream of data stored on it, or an off-chip memory 528 for providing a stream of data stored on it.

As previously described, the VAS 414 shown in FIG. 4 can be broken down into n pages with m addressable memory locations each. However, the VAS 414 is not a physical entity, but is instead comprised of a number of information sources, where each page P[i] refers to a specific block of m addresses within a stream. When a page miss occurs, a processor 502a-502n must look at P[i] to determine which stream of data contains the needed information, and will then retrieve the page of information and place it within the paged area 508 of memory 506. The processor will then have to update the page table 510 to reflect the fact that P[i] is now occupying a particular location within the paged area 508. One of sufficient skill in the relevant art(s) will appreciate that the process of receiving the page fault message, retrieving the needed information from a data stream, storing the information in the paged area 508, and updating the page table 510 can be accomplished by any device that has the ability to interface with both the data streams and the memory 506, such as any of the processors 502a-502n or even, in certain circumstances, a device such as the memory controller 402 shown in FIG. 4.

E. Multiple Processor Architectures

As previously described, the VOM consists of one or more processors 202a-202n as shown in FIG. 2. Each of these processors 202a-202n has access to read and write data to the memory bus 204 either directly or through its own cache 218a-218n. This section deals specifically with the situation where there are a plurality of processors 202a-202n. Further, for the purposes of this discussion, the processors 202a-202n will be indicated as receiving or sending messages over the memory bus 204, when in fact there may be an intermediate cache 218a-218n coupled between the processor 202a-202n and the memory bus 204. As one skilled in the relevant art(s) will appreciate, this is due to the usage of the cache 218a-218n being optional in the implementation of VOM.

When a page table miss occurs, a page table miss message is generated and sent to one of the processors 202a-202n which is then responsible for retrieving the information from the VAS 214 and storing it in the paged area 208 of memory 206. The processor 202a-202n that receives this message need not be the same one requesting information from the memory 206. In an implementation, one processor 202a-202n is dedicated to receiving page miss messages and handling the retrieval of the requested information from the VAS 214 and the storage of the information in the paged area 208 of memory 206. In another implementation, the responsibility of receiving and handling page miss messages as described above is rotated between each of the processors 202a-202n. In yet another implementation, the responsibility of receiving and handling page miss messages as described above is held by the processor 202a-202n that placed the request for information from the paged area 208 of memory 206. These examples are not limiting, however, and one of sufficient skill in the relevant art(s) will appreciate that any number of schemes can be implemented to decide which processor 202a-202n will handle the page miss message processing.

When a processor 202a-202n requests information from the paged area 208 of memory 206 that is not available, the requesting processor 202a-202n aborts the process requesting the information and returns control to another process running on the same processor 202a-202n. Generally, the aborted process is a non-real-time process, since as described above real-time processes do not access the paged area of memory in the preferred implementation, or the pages associated with real-time processes are maintained permanently on-chip. In this situation, control is restored to the real-time process, facilitating the processing demands required by a real-time system.

As mentioned above, there are any number of schemes that can be implemented to decide which processor 202a-202n will handle a page table miss message. In at least one of these schemes, such as the case where each processor 202a-202n is responsible for updating the paged area 208 of memory 206 after a page table miss, there are situations in which a conflict will arise between two or more processors 202a-202n attempting to write to the same location in the page table 210. To resolve this, a semaphore system is used whereby a processor 202a-202n attempting to write to the page table 210

(and subsequently to the paged area 208 of memory 206) first checks if the semaphore is set to a locked state. If the semaphore has been locked, then the processor 202a-202n will have to wait until the semaphore is unlocked. Once the semaphore is unlocked, the processor 202a-202n then locks the semaphore and proceeds to write the new status of the paged area 208 of memory 206 to the page table 210. After writing this information, the processor 202a-202n then unlocks the semaphore, allowing other processors 202a-202n to write to the page table 210. One of sufficient skill in the relevant art(s) will appreciate that this is a general description of a memory protection scheme, and that there are other schemes that can be implemented to protect the page table 210 and paged area 208 of memory 206 from being written by multiple processors 202a-202n simultaneously.

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of processing requests by one or more processors for information from an on-chip memory, wherein the on-chip memory comprises data from a subset of a virtual address space, a paged memory region for storing the data from the subset of the virtual address space, and a page table for storing lookup information to the virtual address space, the method comprising:
   receiving a request for information within the virtual address space to be provided by the on-chip memory;
   consulting the page table to determine if the paged memory region contains the information requested in the virtual address space of the on-chip memory;
   if the information requested within the virtual address space is contained in the on-chip memory, replying to the request for information with the data from the on-chip memory; and
   if the information requested within the virtual address space is not contained in the paged memory region of the on-chip memory, replying to the request for information within the virtual address space with a page table miss message, retrieving the information from the virtual address space onto the on-chip memory and replying to the request for information with the data from the on-chip memory.

2. The method, as set forth in claim 1, wherein the memory further comprises an unpaged memory region, the method further comprising:
   determining if the information requested is contained in the unpaged memory region prior to consulting the page table; and
   if the information requested is contained in the unpaged memory region, replying to the request for information with the information from the unpaged memory region rather than consulting the page table.

3. The method, as set forth in claim 2, wherein at least one of the one or more processors is running a real-time process, further comprising:
   preloading information for the real-time process into the unpaged region of the on-chip memory.

4. The method, as set forth in claim 1, further comprising:
   receiving the page table miss message in one of the one or more processors;
   determining the location of the information requested within the virtual address space;
   retrieving the information from the virtual address space;
   storing the information in the paged memory region; and
   updating the page table to indicate the presence of the information in the paged memory region.

5. The method, as set forth in claim 4, wherein the step of determining the location of the information requested within the virtual address space further comprises:
   identifying one of one or more input streams as the input stream that contains the information requested.

6. The method, as set forth in claim 5, wherein the step of retrieving the information from the virtual address space further comprises:
   reading the information requested from the input stream which contains it.

7. The method, as set forth in claim 4, wherein the step of receiving the page table miss message in the one of the one or more processors further comprises:
   selecting the one of the one or more processors to receive the page table miss message.

8. The method, as set forth in claim 7, wherein the one of the one or more processors that receives the page table miss message has access to a semaphore, further comprising:
   consulting the semaphore prior to updating the page table;
   configuring the semaphore to protect the page table when updating the page table; and
   configuring the semaphore to no longer protect the page table once the page table has been updated.

9. The method, as set forth in claim 1, wherein at least one of the one or more processors is running a non-real-time process, further comprising:
   aborting the non-real-time process when the non-real-time process has requested information from the on-chip memory in response to a page table miss message; and
   returning control to a real-time process running on the same one of the one or more processors.

10. A system for processing a request for information from memory, the system comprising:
    one or more processors; and
    a memory coupled to the one or more processors, the memory comprising:
        a memory controller,
        a paged area of memory, and
        a page table, wherein the page table consists of mappings from a virtual address space to a location in the paged area of memory;
    wherein the memory controller is configured to receive a request for information from one of the processors, to consult the page table in order to determine if information requested is available in the paged area of memory, to retrieve the information from the paged area of memory if the information requested is available in the paged area of memory, and to reply to the request for information with a page table miss message if the information requested is not contained in the paged area of memory, and
    wherein the one or more processors are on the same integrated circuit chip as the memory.

11. The system, as set forth in claim 10, wherein the memory further comprises:

an unpaged area of memory that stores information that will not be paged and is not referenced by the virtual address space or the page table.

12. The system, as set forth in claim 11, wherein each of the one or more processors is configured to run a real-time code base, wherein instructions for the real-time code base are stored in the unpaged area of memory.

13. The system, as set forth in claim 12, wherein each of the one or more processors is configured run one or more instances of a non-real-time process, wherein if one or more of the one or more instances of the non-real-time process requests information from the paged area of memory, and the information is not available in the paged area of memory, the one or more instances of the non-real-time process are terminated and the one or more instances of the real-time process running on the one or more of the one or more processors continues to execute.

14. The system, as set forth in claim 10, further comprising:
one or more data memories, each of the one or more data memories coupled to a corresponding one of the one or more processors, wherein each data memory stores data needed only by the processor to which it is coupled.

15. The system, as set forth in claim 10, further comprising:
one or more caches, each of the one or more caches coupled to a corresponding one of the one or more processors and to the memory, wherein each cache stores information received by the processor to which it is coupled from the memory.

16. The system, as set forth in claim 10, further comprising:
a bus, coupled to the one or more processors and the memory, wherein each of the one or more processors sends requests for information from memory over the bus and the memory sends information or replies to the one or more processors over the bus.

17. The system, as set forth in claim 10, wherein the one or more processors are each further configured to:
select one or more input streams, each of the one or more input streams being a section of the virtual address space;
read information from one of the one or more input streams; and
store the information in the paged area of memory, responsive to receiving a page table miss message.

18. The system, as set forth in claim 17, wherein the one or more input streams consists of one or more TCP/IP input streams.

19. The system, as set forth in claim 17, wherein the one or more input streams consists of one or more off-chip memory input streams.

20. The system, as set forth in claim 17, wherein the one or more input streams consists of one or more on-chip compressed memory input streams.

21. The system, as set forth in claim 10, wherein the physical implementation of the memory comprises a static memory device.

22. A memory located on the same integrated circuit as a processor, the memory comprising:
a paged area of memory;
a page table, wherein the page table consists of mappings from a virtual address space to a location in the paged area of memory; and
a memory controller, wherein the memory controller determines if information requested by the processor at a certain address within the virtual address space is located within the paged area of memory and, if so, replies with the information requested or, if not, replies with a page fault message.

23. The memory, as set forth in claim 22, further comprising:
an unpaged area of memory;
wherein the memory controller determines if information requested by the processor at a certain address is within the unpaged area of memory and, if so, replies with the information requested.

* * * * *